United States Patent
Baijens et al.

(10) Patent No.: US 8,128,179 B2
(45) Date of Patent: Mar. 6, 2012

(54) METHOD FOR OPERATING AN ACTUATING UNIT FOR MOTOR VEHICLE BRAKES

(75) Inventors: Mark Baijens, Mörfelden-Walldorf (DE); Markus Ohly, Lich-Eberstadt (DE)

(73) Assignee: Continental Teves AG & Co. OHG (DE)

( * ) Notice: Subject to any disclaimer, the term of this patent is extended or adjusted under 35 U.S.C. 154(b) by 1445 days.

(21) Appl. No.: 10/515,620

(22) PCT Filed: May 19, 2003

(86) PCT No.: PCT/EP03/05242
§ 371 (c)(1),
(2), (4) Date: Sep. 23, 2005

(87) PCT Pub. No.: WO03/099627
PCT Pub. Date: Dec. 4, 2003

(65) Prior Publication Data
US 2006/0108862 A1 May 25, 2006

(30) Foreign Application Priority Data

May 23, 2002 (DE) .................................. 102 22 722
Jan. 21, 2003 (DE) .................................. 103 02 085

(51) Int. Cl.
*B60T 8/44* (2006.01)
(52) U.S. Cl. ..................................................... 303/114.3
(58) Field of Classification Search ............... 303/115.2, 303/115.3, 114.3, 12; 188/356
See application file for complete search history.

(56) References Cited

U.S. PATENT DOCUMENTS

| | | | | |
|---|---|---|---|---|
| 5,350,225 A * | 9/1994 | Steiner et al. | ............... | 303/113.4 |
| 5,558,413 A * | 9/1996 | Resch | ......................... | 303/115.3 |
| 5,855,420 A * | 1/1999 | Lawrence | ................... | 303/113.4 |
| 5,971,500 A * | 10/1999 | Voges et al. | ................ | 303/113.4 |
| 5,979,292 A * | 11/1999 | Klesen et al. | ............... | 303/114.3 |
| 6,006,648 A * | 12/1999 | Eckert | ........................ | 303/114.3 |
| 6,033,037 A * | 3/2000 | Eckert | ........................ | 303/114.3 |
| 6,209,968 B1 * | 4/2001 | Bayens et al. | ............... | 303/114.3 |
| 6,272,969 B1 * | 8/2001 | Zeuner et al. | .................... | 91/367 |
| 6,318,815 B1 * | 11/2001 | Haupt et al. | ................ | 303/113.4 |
| 2004/0189088 A1* | 9/2004 | Bacardit et al. | ............ | 303/114.3 |

FOREIGN PATENT DOCUMENTS

| | | |
|---|---|---|
| DE | 43 24 688 A1 | 1/1995 |
| DE | 195 27 493 A1 | 1/1997 |
| DE | 195 41 535 A1 | 1/1997 |
| DE | 195 41 101 A1 | 5/1997 |
| DE | 196 09 192 A1 | 9/1997 |
| DE | 196 24 376 A1 | 1/1998 |
| DE | 197 44 052 C1 | 10/1998 |
| DE | 197 20 099 A1 | 11/1998 |
| DE | 199 40 252 A1 | 6/2000 |

* cited by examiner

*Primary Examiner* — Robert Siconolfi
*Assistant Examiner* — James Hsiao
(74) *Attorney, Agent, or Firm* — RatnerPrestia

(57) ABSTRACT

According to a method for operating an actuating unit for motor vehicle brakes, an electromagnet that actuates a sealing seat of its control valve is controlled by a minimum current during a pressure-maintaining phase which is carried out independently of the vehicle operator's will, in order to avoid damaging of the coil of the electromagnet. To this end, a current controlling the electromagnet is slowly reduced until a previously fixed pressure decrease compared to the original value occurs. A previously fixed value is added to this current value, and the electromagnet is actuated by a current value corresponding to the result of the addition.

3 Claims, 4 Drawing Sheets

METHOD FOR OPERATING AN ACTUATING UNIT FOR MOTOR VEHICLE BRAKES

TECHNICAL FIELD

The present invention generally relates to actuating units for motor vehicle brakes and more particularly relates to a method for operating an actuating unit for motor vehicle brakes comprising a master brake cylinder and a pneumatic brake booster including a booster housing whose interior is subdivided by a movable wall into a first chamber (vacuum chamber) and a second chamber (working chamber).

BACKGROUND OF THE INVENTION

A method of this type is disclosed in German patent application DE 196 09 192 A1, for example. In the prior art method, the pressure introduced into the master brake cylinder is compared to a preset pressure signal and, subsequently, generates an output quantity in the form of a control current by which the electromagnet is actuated.

While a pressure-maintaining phase is performed irrespective of the vehicle operator's will, the introduced pressure must be corrected after a certain time in order to minimize the difference that occurred between the predetermined pressure and the pressure introduced into the master cylinder, said difference being caused by leakage of the brake booster, for example. It is considered less advantageous that in the prior art method the control current of the electromagnet stays on a level that brings the coil of the electromagnet to the load limit and, hence, jeopardizes the reliability of operation of the brake booster.

BRIEF SUMMARY OF THE INVENTION

In view of the above, an object of the invention is to disclose a method for operating an actuating unit for motor vehicle brakes of the type mentioned before wherein damage to the coil of the electromagnet (due to excessively high temperatures) is prevented during a pressure-maintaining phase performed irrespective of the vehicle operator's will.

According to the invention, this object is achieved in that the electromagnet is actuated with a minimum current that will not result in a pressure decrease during a pressure-maintaining phase performed irrespective of an actuation initiated by the vehicle operator, not even after the pressure introduced into the master cylinder has been adapted to a predetermined pressure value.

To specify the idea of the invention, provisions are made to ensure that the minimum current value is determined by reducing the current that actuates the electromagnet during the pressure-maintaining phase until a previously fixed pressure decrease occurs and a previously fixed value $I_0$ is added to this reduced current value.

Another favorable design of the method of the invention provides that a pressure value ($p_{nominal,\ internal}$) predetermined by the electronic control and regulating unit is used during the transition from the pressure-maintaining phase to an increase or decrease phase in order to minimize the difference between a nominal pressure value ($p_{nominal}$) and an actual pressure value ($p_{actual}$). It is hereby achieved that the actual pressure value ($p_{actual}$) is smoothly and homogeneously adapted to the new, modified nominal pressure value ($p_{nominal}$).

DETAILED DESCRIPTION OF THE PREFERRED EMBODIMENTS

Figure 1:
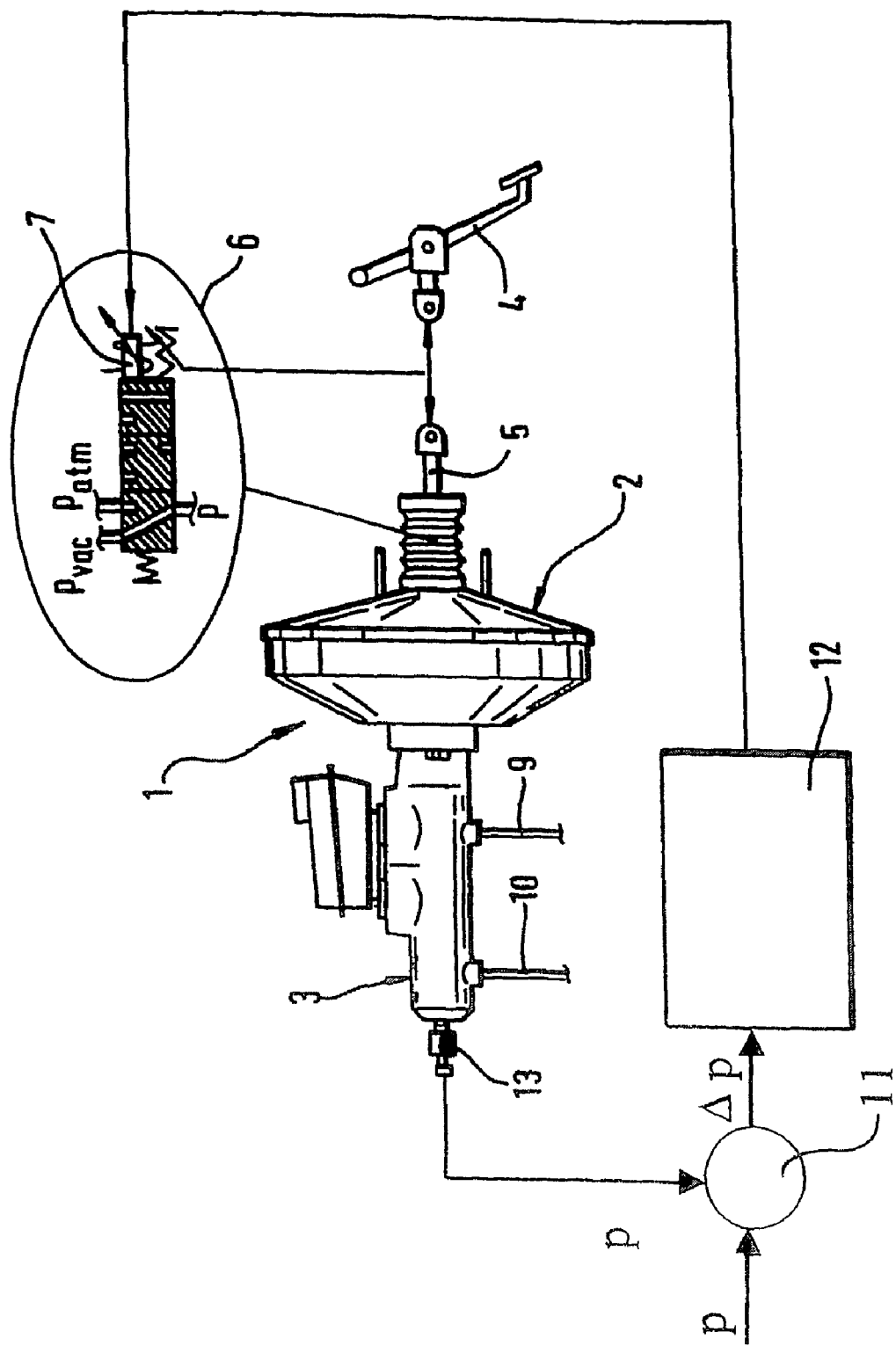
FIG. 1 is a greatly simplified view of a hydraulic brake system, wherein the method of the invention can be implemented.

The brake system for motor vehicles partly illustrated in FIG. 1 is basically comprised of an actuating unit 1, a pressure controller 12 and non-illustrated wheel brakes of a motor vehicle. The actuating unit 1, in turn, comprises a pneumatic brake booster, preferably a vacuum brake booster 2, operable by means of an actuating pedal 4 and independently of an operation initiated by the vehicle operator. Connected downstream of the brake booster is a master brake cylinder, preferably a tandem master cylinder 3, whose pressure chambers (not shown) are connected to the wheel brakes by way of hydraulic conduits 9, 10. Coupled to the actuating pedal 4 is an actuating rod 5 that is used to mechanically actuate a merely represented control valve 6 that controls the increase and decrease of a pneumatic differential pressure in the housing of the vacuum brake booster 2. In this arrangement, an electromagnet 7 enables an (independent) actuation of the control valve 6 irrespective of the actuation initiated at the actuating rod 5 by the driver of the vehicle. The electromagnet 7 is then actuated by an actuating signal of the pressure controller 12 by means of a current control element comprised in the pressure controller 12. A pressure sensor 13 connected to one of the pressure chambers of the tandem master cylinder 3 determines the hydraulic pressure introduced into the tandem master cylinder 3.

A preset pressure signal $P_{nominal}$ is sent to the comparator circuit 11 and is compared with the hydraulic pressure $P_{actual}$ introduced into the master brake cylinder 3 and determined by the above-mentioned pressure sensor 13 in order to produce a deviation $\Delta p$. The comparison result $\Delta p$ is sent as an input quantity to the pressure controller 12, which, in turn, actuates the electromagnet 7 by means of the current control element as mentioned hereinabove.

Figure 2:
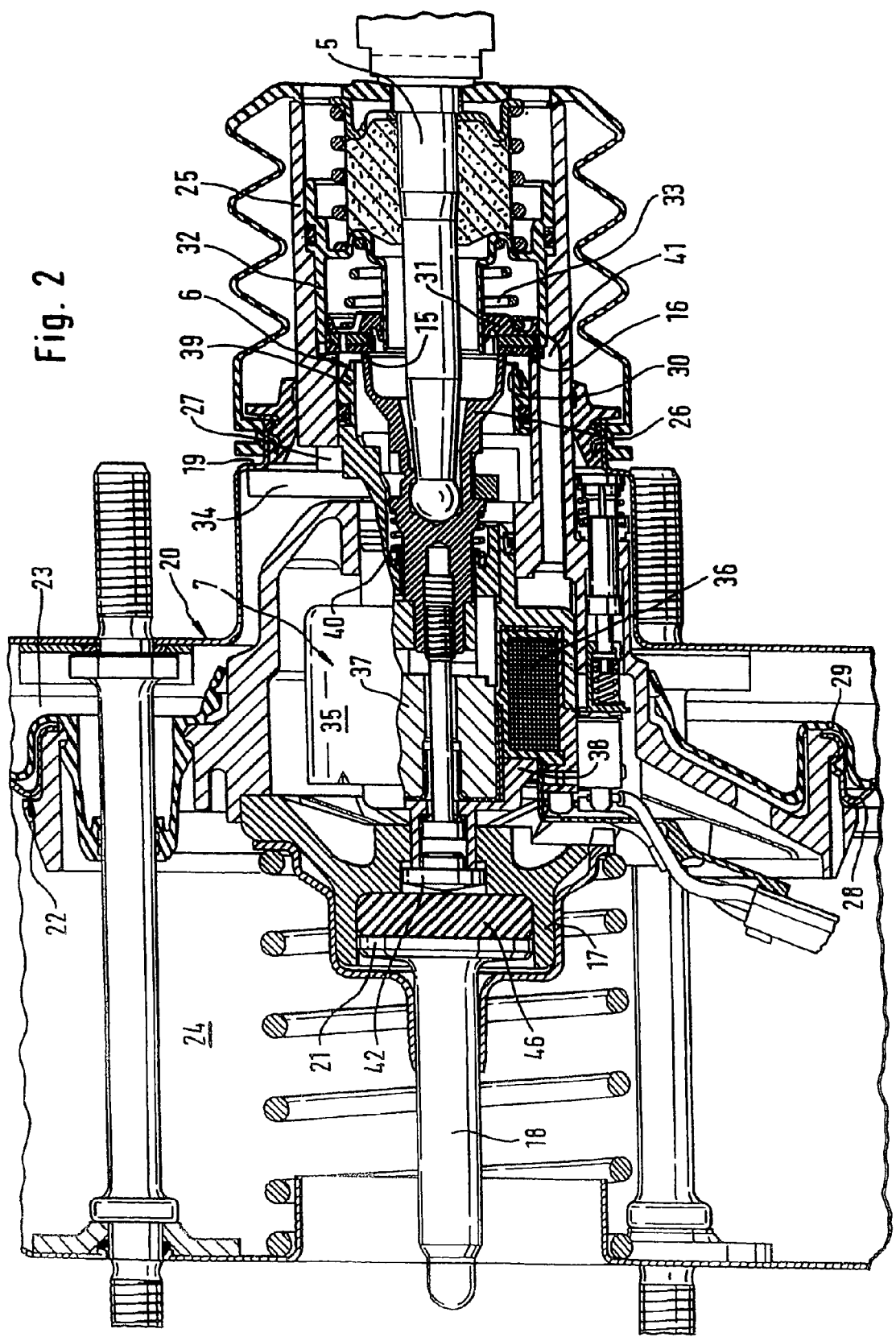
FIG. 2 is a longitudinal cross-sectional view, partly broken off, of an independently operable brake booster in the inactive ready position.

FIG. 2 shows a design of an independently operable vacuum brake booster that can be employed for the purpose of the mentioned pressure control. The merely represented booster housing 20 of this brake booster is subdivided into a working chamber 23 and a vacuum chamber 24 by means of an axially movable wall 22. The axially movable wall 2 is composed of a deepdrawn sheet-metal diaphragm plate 28 and a flexible diaphragm 29 abutting thereon which, as a rolling diaphragm, provides a sealing between the outside periphery of the diaphragm plate 28 and the booster housing 20, what is not shown in detail.

A control valve 6 operable by means of the actuating rod 5 is incorporated in a control housing 25 that is sealed and guided in the booster housing 20 and carries the movable wall 22, said control valve being composed of a first sealing seat 15 designed at the valve piston 26 connected to the actuating rod 5, a second sealing seat 16 designed in the control housing 25, a third sealing seat 30 arranged radially between the two sealing seats 28, 29, and an annular valve member 31 that cooperates with the sealing seats 15, 16, 30 and is guided in a guiding member 32 arranged and sealed in the control housing 25. Valve member 31 is biased towards the sealing seats 15, 16, 30 by means of a valve spring 33 supported on the guiding member 32. The working chamber 3 is connectable to the vacuum chamber 4 by way of a channel 41 that extends laterally in the control housing 25.

The brake force is transmitted onto an actuating piston of a master brake cylinder (not shown) of the brake system by way of a rubber-elastic reaction plate 36 that abuts frontally on a front part 17 supported on the control housing 25 as well as a push rod 18 including a head flange 21, said master brake cylinder being fitted to the vacuum-side booster housing shell.

A channel 27 extending in a roughly radial direction is designed in the control housing 25 to connect the working chamber 3 to the atmosphere when the control valve 6 is actuated. The return movement of the valve piston 26 at the end of a braking operation is limited by a transverse member 34 which, in the release position of the vacuum brake booster shown in the drawing, abuts on a stop 19 designed in the booster housing 1.

To initiate an actuation of the brake booster shown in FIG. 2 independently of the vehicle operator's will, there is provision of the electromagnet 7 mentioned with respect to FIG. 1. Said electromagnet 7 is preferably arranged in a housing 35 being rigidly connected to the valve piston 26 and, hence, displaceable along with the valve piston 26 in the control housing 25. Electromagnet 7 comprises a coil 36 arranged within the housing 35 and an axially slidable cylindrical armature 37 that is partly guided in a closure member 38 closing the housing 35 and on which a force transmitting sleeve 39 is supported that carries the above-mentioned third sealing seat 30. Arranged between the valve piston 26 and the force-transmitting sleeve 39 is a compression spring 40 that retains the armature 37 in its initial position in which the third sealing seat 30 is positioned axially offset relative to the first sealing seat 15 configured at the valve piston 26. The closure member 38 guided in the control housing 25 abuts on the above-mentioned reaction plate 36 by the intermediary of a transmission plate 42 and permits transmitting the input force introduced at the actuating road 5 onto the reaction plate 36.

The following description relates only to the case that an increase phase, a maintaining phase, or a decrease phase of the hydraulic pressure introduced into the master brake cylinder 3 is performed independently of the vehicle operator's will.

Figure 3:
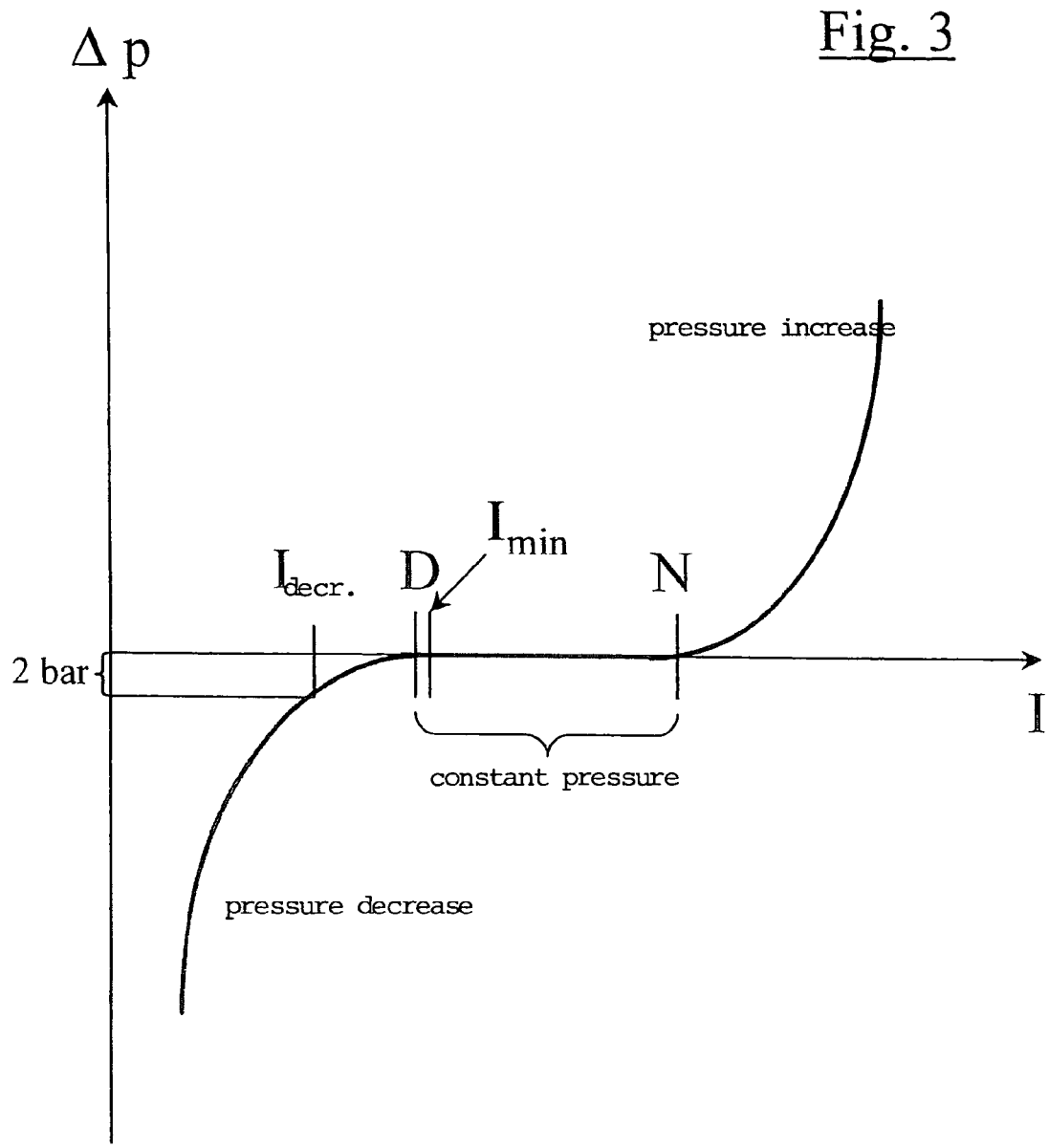
FIG. 3 is a view showing a variation of the pressure $\Delta p$ introduced into the master cylinder in dependence on the current I supplied to the electromagnet.

In the prior art method, a comparatively high current is applied to control the electromagnet 7 during a pressure-maintaining phase and especially also after an adaptation of the pressure introduced into the master brake cylinder 3 to the predetermined pressure value, said adaptation taking place during the pressure-maintaining phase. This comparably high current loads the coil of the electromagnet 7 to an unnecessarily high degree. The state of affairs is explained by way of FIG. 3 depicting the pressure variation $\Delta p$ in the master brake cylinder 3 in dependence on the current I by which the electromagnet 7 is actuated. It can be seen that a current whose value ranges between the points D and N does not have a pressure variation as a consequence. Where the objective is to raise the pressure introduced into the master brake cylinder 3, the electromagnet 7 must be driven by means of a current exceeding the current value $I_N$ of point N, the so-called pressure increase point. For the pressure decrease in the master brake cylinder, it is accordingly needed to actuate the electromagnet 7 with a current that is lower than the current value $I_D$ of point D, the so-called pressure decrease point. In the prior art method, as previously mentioned, a comparatively high current is applied to actuate the electromagnet 7 during a pressure-maintaining phase and especially after an adaptation of the pressure introduced into the master brake cylinder 3 to the predetermined pressure value, said current corresponding to the value close to the pressure increase point N in FIG. 3. The pressure-maintaining phase is realized even when the current adopts a value which is somewhat higher than the current value $I_D$ of the pressure decrease point D, however, essentially lower than the current value $I_N$ of the pressure increase point N in FIG. 3.

This is why, according to the novel method, the electromagnet 7 is actuated by means of a low current value $I_{min}$, which has just not yet an initiated pressure reduction as a result, during a pressure-maintaining phase and also after an adaptation of the pressure $p_{actual}$ to the predetermined pressure value $p_{nominal}$ that takes place during the pressure-maintaining phase. This current value $I_{min}$ is slightly higher than the current value $I_D$ of the pressure decrease point D in FIG. 3. The current value $I_N$ of the pressure increase point N and of the pressure decrease point D, $I_D$ and, hence, also the current value $I_{min}$, however, adopt individual values for each brake booster because they e.g. vary with the age of the brake booster and also in response to ambient conditions (strength of the engine vacuum, temperature).

For this reason the minimum current value $I_{min}$, which has just not yet an initiated pressure decrease as a result, must be determined anew during each (independently actuated) pressure-maintaining phase. To this end, the current is slowly reduced until a previously fixed pressure decrease of e.g. 2 bar occurs. A previously fixed value $I_0$ is added to this current value $I_{decr}$. The result $I_{min}$ is the current value by means of which the electromagnet 7 is actuated during the pressure-maintaining phase.

Figure 4:
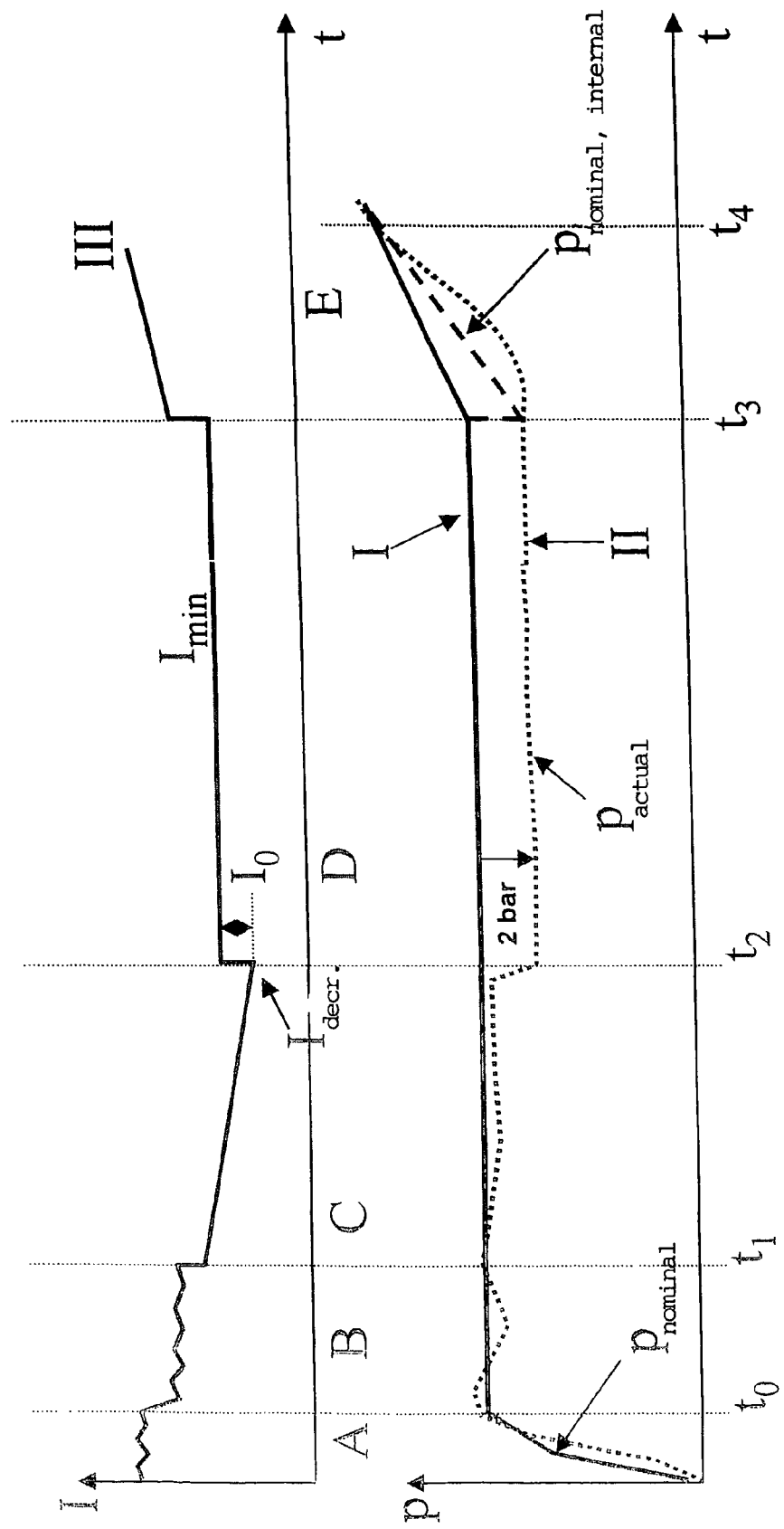
FIG. 4 shows time variations of the current supplied to the electromagnet and the pressure introduced into the master cylinder during a pressure-maintaining phase performed irrespective of the vehicle operator's will.

For illustrating the method of the invention, reference is being made to FIG. 4 wherein three time variations in total are shown which are characterized by Roman numerals I to III. The time variation I shows the pressure value $p_{nominal}$ which is predetermined e.g. by a sensor provided outside the control system, while the time variation II depicts the pressure $p_{actual}$ introduced into the master brake cylinder 3. The time variation III represents the current that is necessary to reach the mentioned pressure variation and actuates the electromagnet 7.

A pressure increase phase is illustrated in section A. When the predetermined pressure value remains constant for a certain time (section B), it is started at time $t_1$ to slowly reduce the current that actuates the electromagnet 7 until a previously fixed decrease of the pressure introduced into the master brake cylinder 3 compared to the pressure value at time $t_1$ of e.g. 2 bar occurs. A previously fixed value $I_0$ is added to the current value $I_{decr}$ reached at time $t_2$. The electromagnet 7 is actuated by means of the so established current value $I_{min}$ during the continuous pressure-maintaining phase (section D).

In the event of a change of the nominal pressure value ($p_{nominal}$) or, as shown in FIG. 4, in a transition to a pressure increase phase (section E), a pressure $p_{nominal,internal}$ predetermined by the electronic control and regulating unit is used to prevent the pressure $p_{actual}$ introduced into the master brake cylinder 3 from adapting too quickly to the predetermined pressure $p_{nominal}$, or in order to prevent overshooting of the pressure $p_{actual}$ introduced into the master brake cylinder 3. In the event of a very quick adaptation, the introduced pressure $p_{actual}$ can become substantially higher than the predetermined pressure $p_{nominal}$ for a short time, what the passengers of the motor vehicle will register as uncomfortable bucking. The internally predetermined pressure $p_{nominal, internal}$ adopts the value of $p_{actual}$ at the commencement of the pressure increase phase, i.e. at the time $t_3$ in FIG. 3, and gradually approaches the predetermined pressure value $p_{nominal}$. The gradient of the change, however, is limited so that the internally predetermined pressure $p_{nominal,\ internal}$ will adopt the value of $p_{nominal}$ after some time only, at time $t_4$. In all other respects, the pressure controller 12 (see FIG. 1) operates again as before the start of the method of the invention (see section A) until the nominal pressure value ($p_{nominal}$) again stays constant for a defined period of time.

The invention claimed is:

1. Method for operating an actuating unit for motor vehicle brakes comprising a master brake cylinder and a pneumatic brake booster including a booster housing whose interior is subdivided by a movable wall into a first chamber (vacuum chamber) and a second chamber (working chamber), and including a control housing which accommodates a control valve controlling a pneumatic pressure difference that acts on the movable wall, said control valve comprising a first sealing seat that is operable by an actuating rod and the opening of which allows ventilating the working chamber, a second sealing seat the opening of which allows a connection between the two chambers, as well as an elastic valve member cooperating with the two sealing seats, wherein the first sealing seat or another sealing seat cooperating with the valve member is operable independently of an operation initiated by the vehicle operator in the sense of ventilating the working chamber by means of an electromagnet actuatable by way of an electronic control and regulating unit, and an increase, a maintaining and a decrease phase of the hydraulic pressure introduced into the master brake cylinder is realized by actuation of the electromagnet, wherein the electromagnet is actuated with a minimum current and will not result in a pressure decrease during a pressure-maintaining phase performed irrespective of an actuation initiated by the vehicle operator, not even after the pressure introduced into the master cylinder has been adapted to a predetermined pressure value, and the minimum current is maintained at a substantially constant value until entry of a pressure increase or pressure decrease phase.

2. Method as claimed in claim 1, wherein the minimum current value is determined by reducing the current that actuates the electromagnet during the pressure-maintaining phase until a previously fixed pressure decrease occurs and a previously fixed value $I_0$ is added to this reduced current value.

3. Method as claimed in claim 2, wherein a pressure value ($p_{nominal/internal}$) predetermined by the electronic control and regulating unit is used during the transition from the pressure-maintaining phase to an increase or decrease phase in order to minimize the difference between a nominal pressure value ($p_{nominal}$) and an actual pressure value ($p_{actual}$).

* * * * *